US010404073B2

(12) United States Patent
Miyake et al.

(10) Patent No.: US 10,404,073 B2
(45) Date of Patent: Sep. 3, 2019

(54) POWER GENERATION SYSTEM AND METHOD THAT CONTROLS PRODUCTION OF POWER BY A POWER GENERATION FACILITY

(71) Applicant: HITACHI, LTD., Tokyo (JP)

(72) Inventors: Toshiyuki Miyake, Tokyo (JP); Shinichi Kondou, Tokyo (JP); Masachika Nakatani, Tokyo (JP)

(73) Assignee: HITACHI, LTD., Tokyo (JP)

( * ) Notice: Subject to any disclaimer, the term of this patent is extended or adjusted under 35 U.S.C. 154(b) by 218 days.

(21) Appl. No.: 15/517,854

(22) PCT Filed: Oct. 14, 2014

(86) PCT No.: PCT/JP2014/077315
§ 371 (c)(1),
(2) Date: Apr. 7, 2017

(87) PCT Pub. No.: WO2016/059668
PCT Pub. Date: Apr. 21, 2016

(65) Prior Publication Data
US 2017/0310115 A1 Oct. 26, 2017

(51) Int. Cl.
*H02J 3/46* (2006.01)
*G06Q 50/06* (2012.01)
(Continued)

(52) U.S. Cl.
CPC ................ *H02J 3/46* (2013.01); *G06Q 50/06* (2013.01); *H02J 3/008* (2013.01); *H02J 3/382* (2013.01);
(Continued)

(58) Field of Classification Search
CPC ........................................................ H02J 3/46
See application file for complete search history.

(56) References Cited

U.S. PATENT DOCUMENTS

2011/0153098 A1 6/2011 Tomita et al.
2013/0221671 A1 8/2013 Yasugi
2013/0229059 A1 9/2013 Baba et al.

FOREIGN PATENT DOCUMENTS

JP 2011-130638 A 6/2011
JP 2012-130096 A 7/2012
(Continued)

OTHER PUBLICATIONS

Deqiang Gan and E. Litvinov, "Energy and reserve market designs with explicit consideration to lost opportunity costs," IEEE Transactions on Power Systems, vol. 18, No. 1, pp. 53-59, Feb. 2003.doi: 10.1109/TPWRS.2002.807052 (Year: 2003).*
(Continued)

*Primary Examiner* — Ronald D Hartman, Jr.
(74) *Attorney, Agent, or Firm* — Volpe and Keonig, P.C.

(57) ABSTRACT

A power generation facility operation device includes an opportunity loss calculator for calculating a power generation opportunity loss value, (a loss value resulting from losing the power generation opportunity when output of the power generated from a power generation facility is reduced according to a request for provision of reserve power desired by an electric power provider), a reserve power incentive calculator for calculating a reserve power incentive value, (a value equivalent to an incentive obtained by the electric power producer from the electric power provider by output control being performed in the power generation facility and the reserve power being supplied to the electric power provider, and a reserve power plan calculator for calculating a plan of the reserve power that the power generation facility is to secure in order to keep the power generation opportunity loss value below the reserve power incentive value.

12 Claims, 12 Drawing Sheets

(51) Int. Cl.

| | |
|---|---|
| ***H02J 3/38*** | (2006.01) |
| ***H02J 3/00*** | (2006.01) |
| *F03D 7/02* | (2006.01) |
| *F03D 7/04* | (2006.01) |

(52) U.S. Cl.
CPC ............ *F03D 7/0284* (2013.01); *F03D 7/048* (2013.01); *F05B 2270/335* (2013.01); *H02J 3/383* (2013.01); *H02J 3/386* (2013.01); *Y02E 10/763* (2013.01); *Y04S 50/10* (2013.01)

(56) References Cited

FOREIGN PATENT DOCUMENTS

| | | | |
|---|---|---|---|
| JP | 2012-241576 | A | 12/2012 |
| WO | 2013/118266 | A1 | 8/2013 |
| WO | 2013/125043 | A1 | 8/2013 |

OTHER PUBLICATIONS

WO-2013118266-A1—"English Machine Translation" (Year: 2013).*
Grid connection technical requirements for wind power generation facilities [extra high-volume edition], Dec. 2012, Tohoku Electric Power Co., Ltd. (Japanese Language), 19 pgs.
International Standard No. IEC 61400-25-2, "Wind turbines—Part 25-2: Communications for monitoring and control of wind power plants—Information models," Annex C, Dec. 14, 2006, 10 pgs.
Article 2 (14) of the Electricity Business Act (Japanese Language), 3 pgs.
International Search Report, PCT/JP2014/077315, dated Jan. 6, 2015, 1 pg.

* cited by examiner

[Fig. 1]
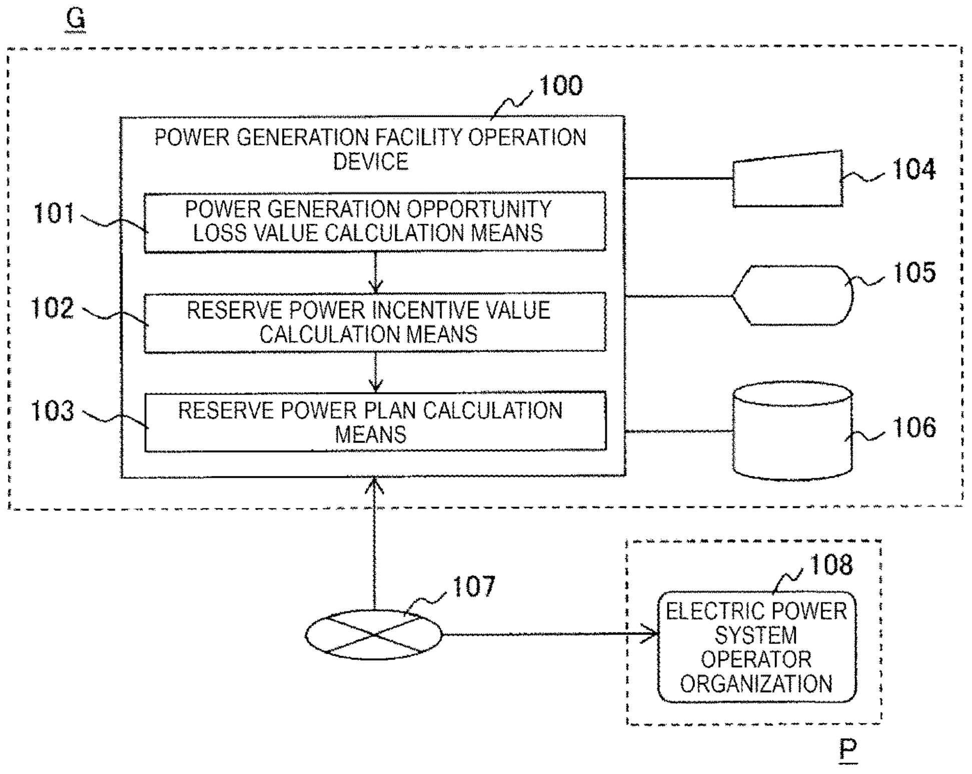

[Fig. 2]
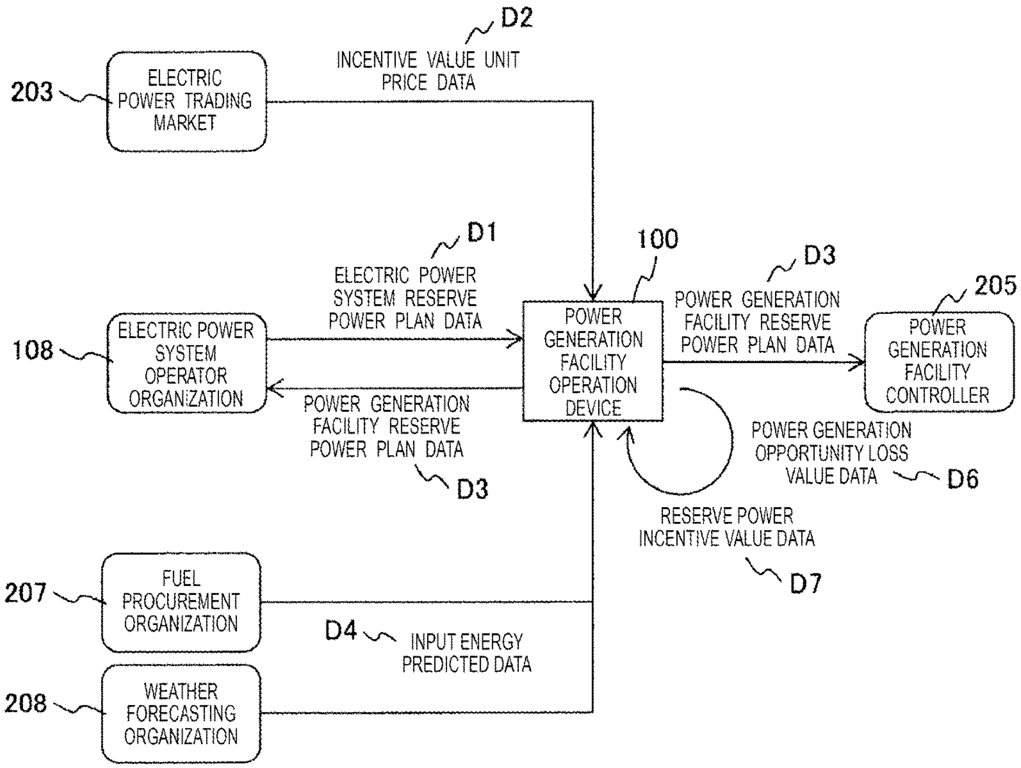
[Fig. 3]
301 302 303 D1
| TIME t [YEAR/MONTH/DAY HRS: MINS: SECS] | | PERIOD [SECS] | NECESSARY RESERVE POWER PSres(t)[kW] |
|---|---|---|---|
| t0 | 2015/01/01 [00:00:00] | 1800 | 1000 |
| t1 | 2015/01/01 [00:30:00] | 1800 | 2000 |
| t2 | 2015/01/01 [01:00:00] | 1800 | 2000 |
| t3 | 2015/01/01 [01:30:00] | 1800 | 3000 |
| t4 | 2015/01/01 [02:00:00] | 1800 | 1000 |
| | ... | ... | ... |
| | ... | ... | ... |
| | ... | ... | ... |

[Fig. 4]
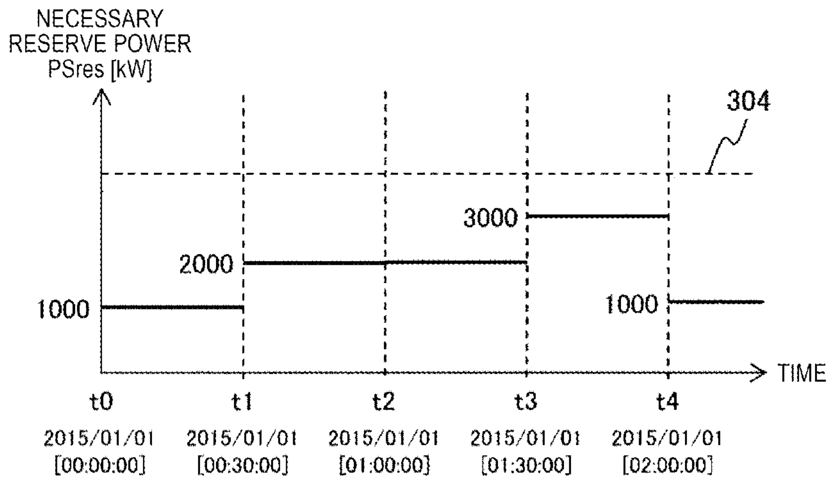
[Fig. 5]
401 402 403
D3
| TIME t [YEAR/MONTH/DAY HRS: MINS: SECS] | | PERIOD [SECS] | POWER GENERATION FACILITY PLANNED RESERVE POWER VALUE PPres(t)[kW] |
|---|---|---|---|
| t0 | 2015/01/01 [00:00:00] | 1800 | 800 |
| t1 | 2015/01/01 [00:30:00] | 1800 | 1500 |
| t2 | 2015/01/01 [01:00:00] | 1800 | 1500 |
| t3 | 2015/01/01 [01:30:00] | 1800 | 2000 |
| t4 | 2015/01/01 [02:00:00] | 1800 | 800 |
| | ... | ... | ... |
| | ... | ... | ... |
| | ... | ... | ... |

[Fig. 6]
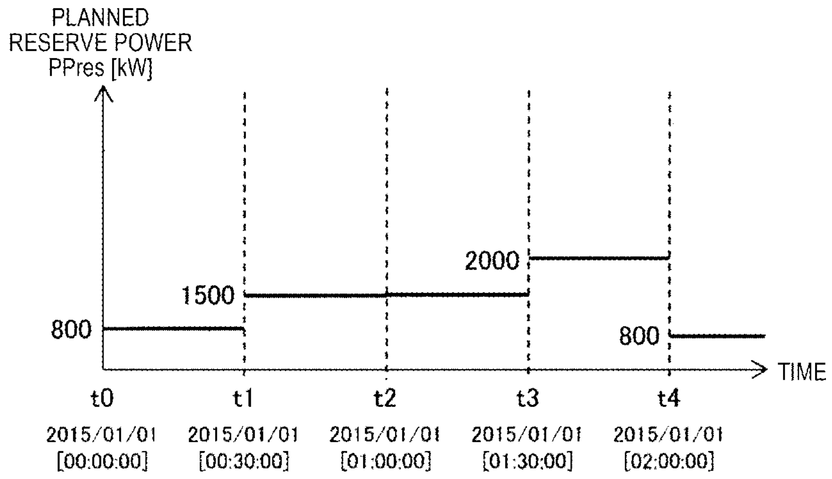
[Fig. 7]
D2
| TIME t [YEAR/MONTH/DAY HRS: MINS: SECS] (501) | | PERIOD [SECS] (502) | INCENTIVE VALUE UNIT PRICE PRinc(t)[¥/kWh] (503) |
|---|---|---|---|
| t0 | 2015/01/01 [00:00:00] | 1800 | 20 |
| t1 | 2015/01/01 [00:30:00] | 1800 | 30 |
| t2 | 2015/01/01 [01:00:00] | 1800 | 30 |
| t3 | 2015/01/01 [01:30:00] | 1800 | 40 |
| t4 | 2015/01/01 [02:00:00] | 1800 | 20 |
| | ... | ... | ... |
| | ... | ... | ... |
| | ... | ... | ... |

[Fig. 8]
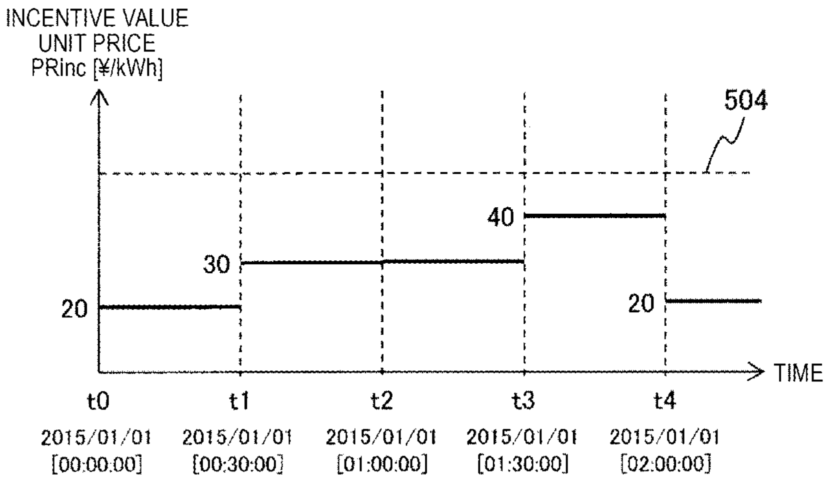
[Fig. 9]
601 602 603
D4
| TIME t [YEAR/MONTH/DAY HRS: MINS: SECS] | | PERIOD [SECS] | INPUT ENERGY PREDICTED VALUE Peng(t)[kW] |
|---|---|---|---|
| t0 | 2015/01/01 [00:00:00] | 1800 | 30 |
| t1 | 2015/01/01 [00:30:00] | 1800 | 30 |
| t2 | 2015/01/01 [01:00:00] | 1800 | 25 |
| t3 | 2015/01/01 [01:30:00] | 1800 | 25 |
| t4 | 2015/01/01 [02:00:00] | 1800 | 20 |
| | ... | ... | ... |
| | ... | ... | ... |
| | ... | ... | ... |

[Fig. 10]
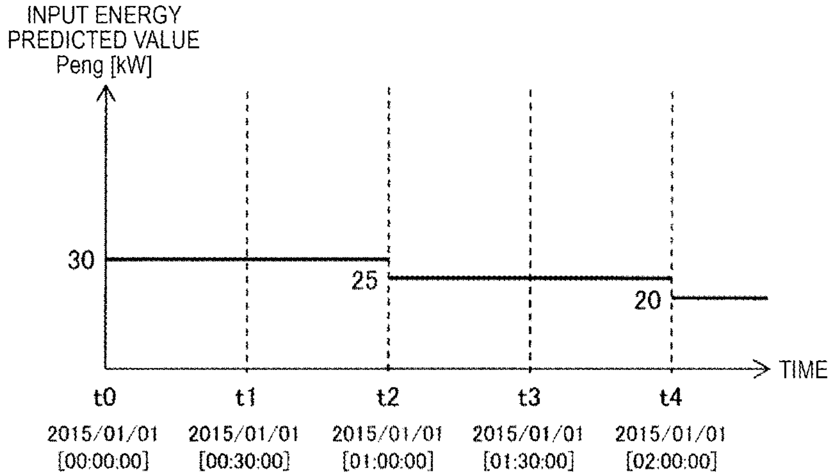

[Fig. 11]
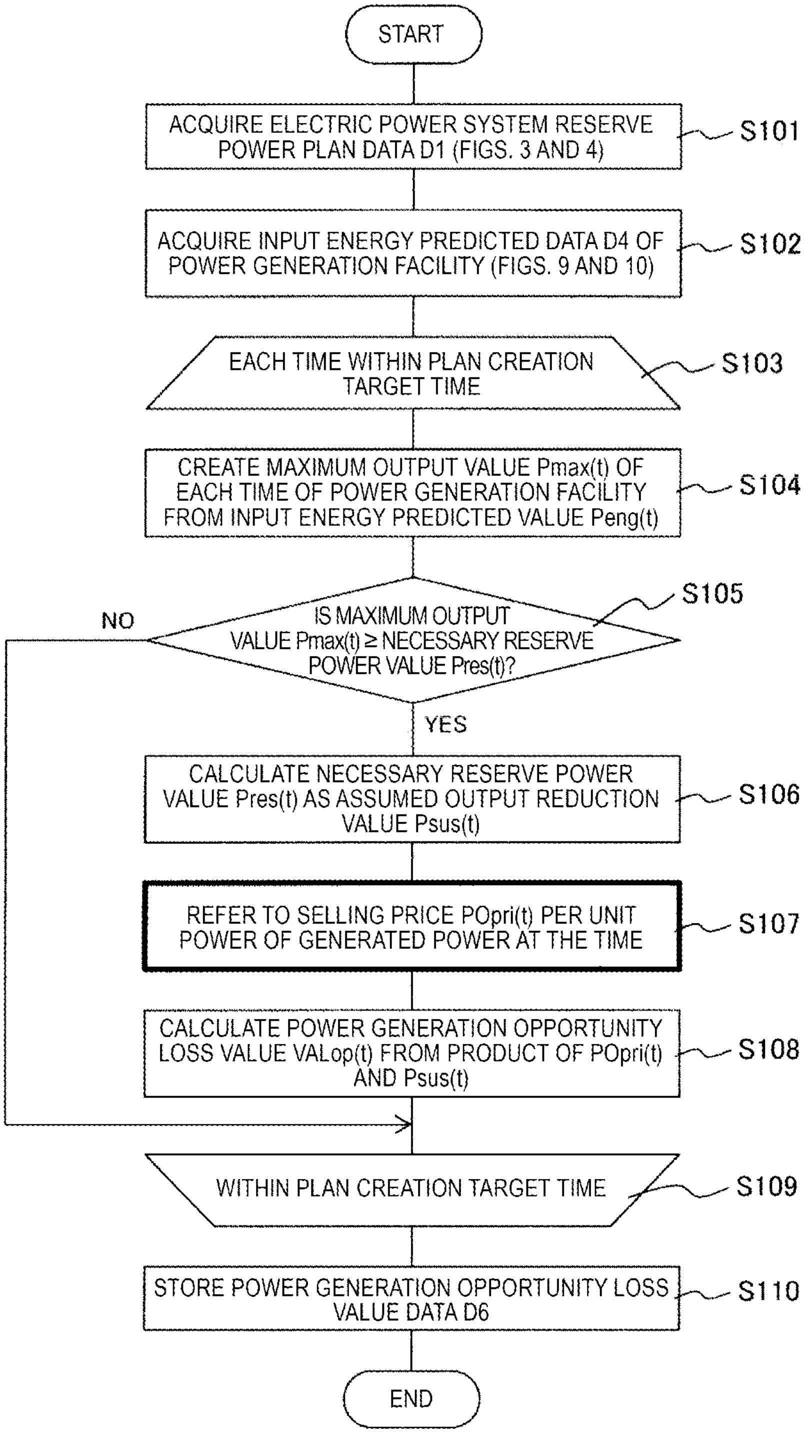

[Fig. 12]
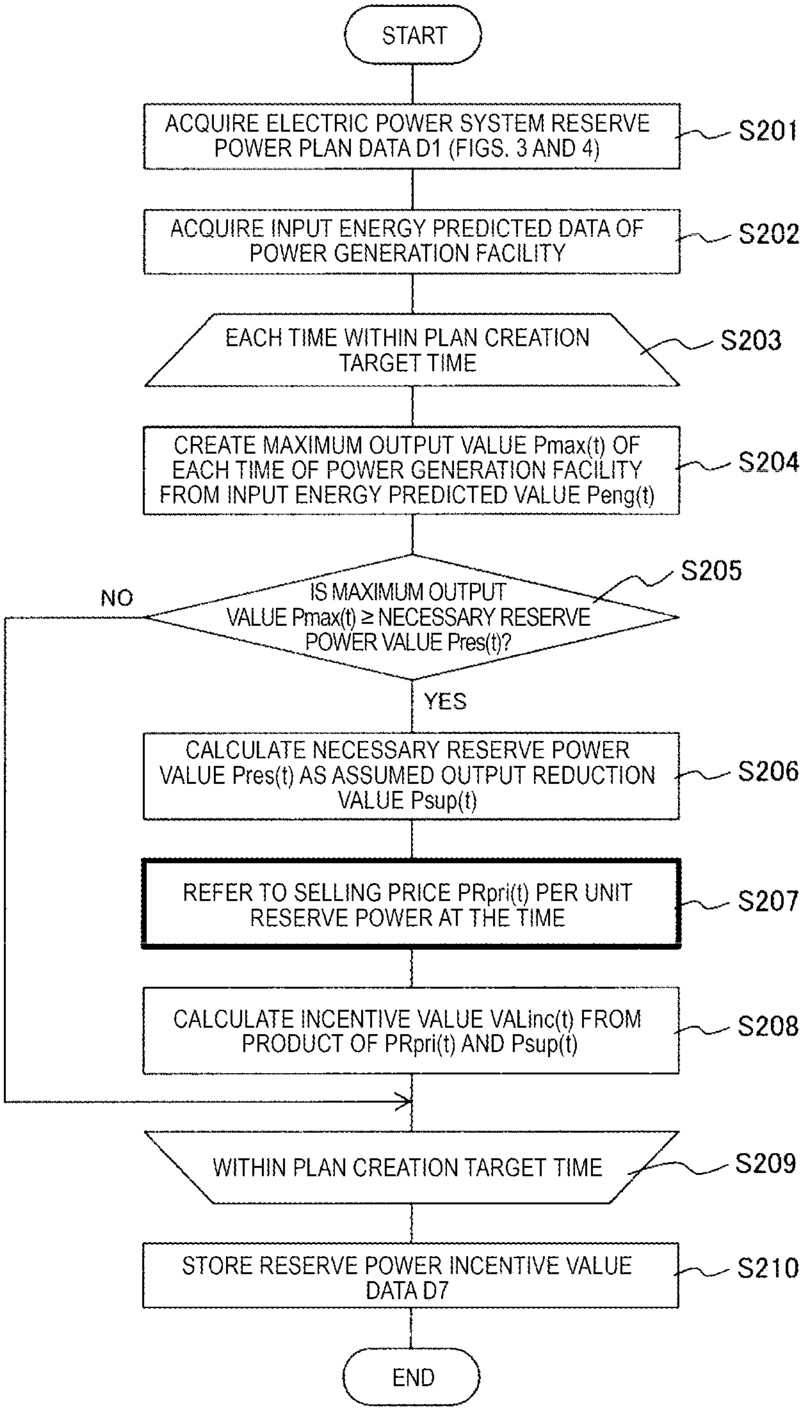

[Fig. 13]
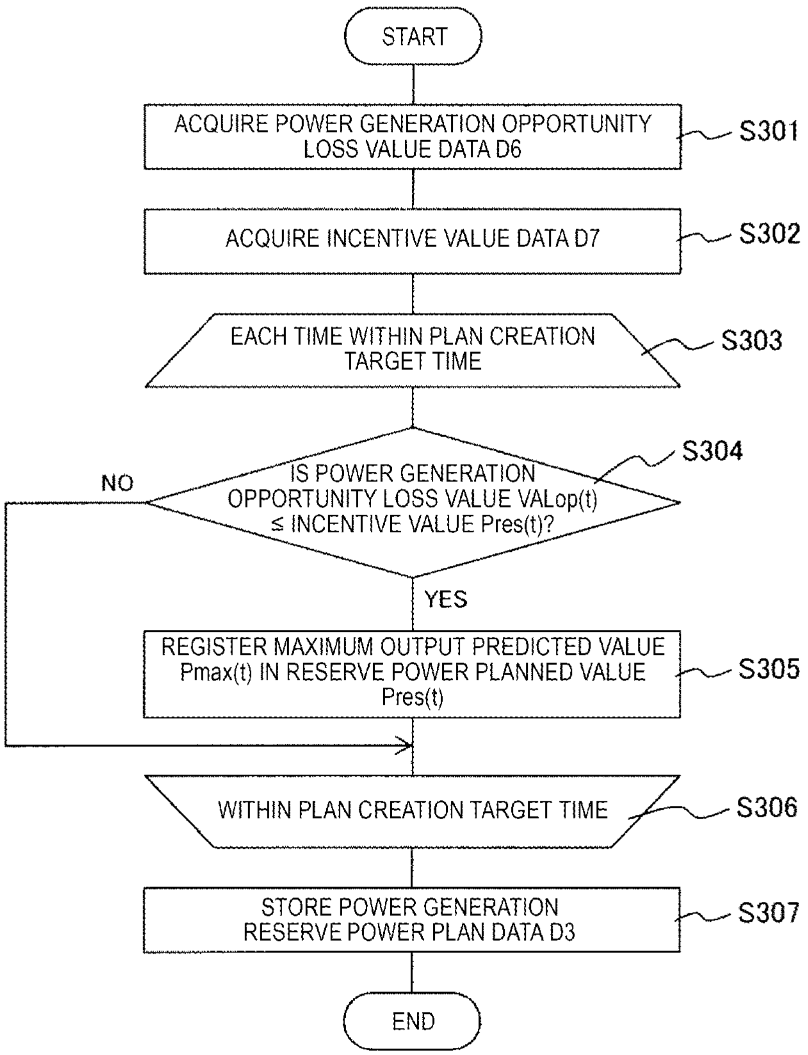

[Fig. 14]
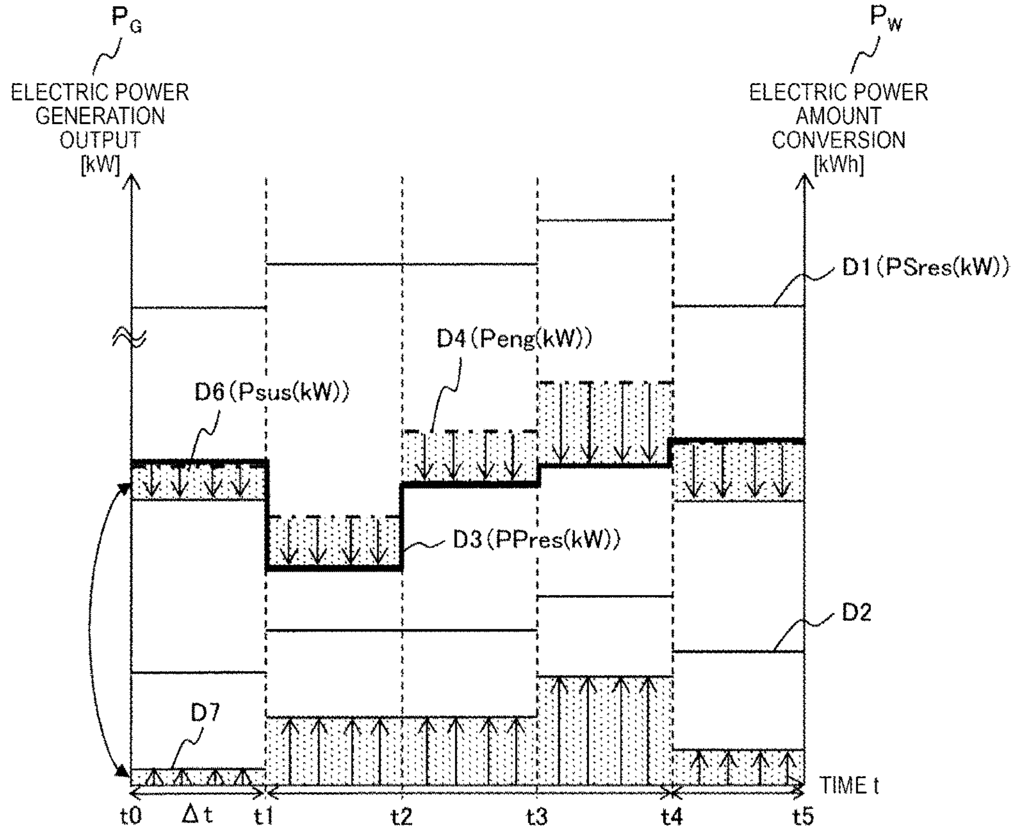

[Fig. 15]
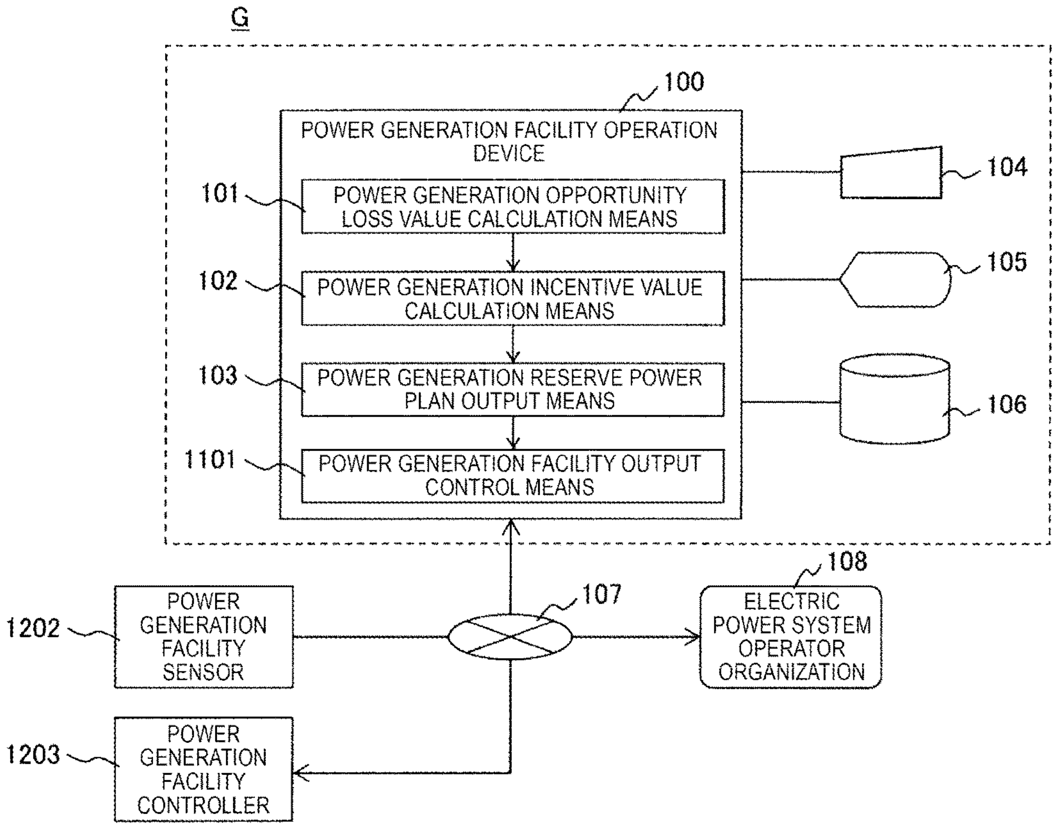

[Fig. 16]
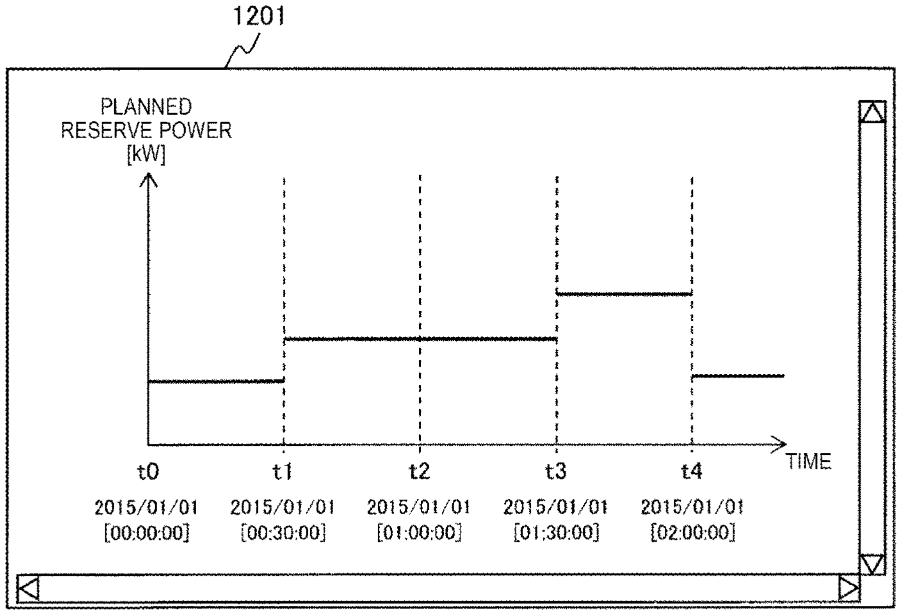

POWER GENERATION SYSTEM AND METHOD THAT CONTROLS PRODUCTION OF POWER BY A POWER GENERATION FACILITY

TECHNICAL FIELD

The present invention relates to a power generation facility operation device and an operation method.

BACKGROUND ART

In recent years, introduction of a renewable energy power source that uses solar power generated or wind power generated renewable energy is expanding all over the world as a global warming prevention measure.

The solar power generated or wind power generated renewable energy power source does not discharge carbon dioxide caused by combustion of fossil fuel. Meanwhile, power generation output depends on weather conditions such as solar radiation and wind conditions. Therefore, there is a problem in that a mega solar grid connection in which solar power generation panels are aggregated on a large scale or a grid connection of a wind farm in which a number of wind turbine generators are aggregated has a large influence on stable operation of an electric power system.

Therefore, output control capability or connection operation is required to be equivalent to thermal power generation, and for example, the connection requirement of the electric power system of a wind farm is defined in a power company or an international standard. NPL 1 indicates an example of the connection requirement in a power company, and NPL 2 indicates an example of the connection requirement in an international standard.

In addition, in the operation of the electric power system, it is necessary to set a so-called "simultaneous same amount" in which the balance of supply and demand is within the permissible range due to a characteristic in that it is not possible to stably supply power when balance of a supply amount with respect to an amount of demand of power deviates from a permissible range, and it is not possible to store electric energy. The "simultaneous same amount" in the supply of power is legally defined, for example, in Japan, in the Electricity Business Act (NPL 3).

In addition, in the electric power system, maintenance of balance of supply and demand (supply and demand balance) may be broken from a gap (supply shortage caused by power drop, upward swing of demand, and the like) of a power supply plan with respect to prediction of an amount of power demand. When supply and demand balance breaks exceeding a certain range, frequency or voltage of the electric power system varies, an electrical facility of a customer is not normally operated, or the electric power system has even a large power outage in an extreme case, and there is a significant negative influence on maintenance of power quality of the electric power system. In the related art, thermal power generation or hydro power generation is used as a power source for supply and demand balance adjustment to eliminate the influence. Recently, there is a concern that there is shortage of the power source for supply and demand balance adjustment in the electric power system caused by an increase of connection of the renewable energy power source in which output variation depends on weather conditions.

Therefore, a role is desired as a power source with adjustable supply and demand balance of the electric power system in the renewable energy power source itself. For example, PTL 1 discloses a method for driving by intentionally reducing output of each windmill, and securing reserve power in a wind farm.

In addition, for example, PTL 2 discloses a method for increasing and reducing the number of windmill groups for adjusting output variation considering a case in which an incentive is given with respect to output variation reduction of an increase of an electric power purchase price and the like of the wind farm with less output variation when an amount of introduction of the wind farm increases.

CITATION LIST

Patent Literature

PTL 1: WO 2013/125043
PTL 2: JP-A-2012-241576

Non-Patent Literature

NPL 1: "Grid connection technical requirements for wind power generation facilities [extra high-voltage edition]" December 2012, Tohoku Electric Power Co., Ltd.
NPL 2: Standard Number IEC61400-25-2 (Wind turbines—Part 25-2: Communications for monitoring and control of wind power plants—Information models) Annex C, 14 Dec. 2006
NPL 3: Article 2(14) of the Electricity Business Act

SUMMARY OF INVENTION

Technical Problem

Electric power systems are generally classified as two types of operator facilities. One operator is an existing electric power provider (power company), owns a power generation facility and a power transmission facility and supplies power that has a guaranteed quality (frequency of the electric power system or stable supply of voltage) to each customer. The electric power system operator such as the electric power provider (power company) or a power transmission operator are equivalent to the operators under a separation system of power generation and power transmission that is assumed in the future. In the present specification, the existing operators are hereinafter generically named electric power providers.

In contrast, other operators are a plurality of electric power producers (power generation companies) that perform only power generation and utilize a facility of an existing electric power provider (power company) in power transmission. The electric power producer is equivalent to an industrial electric power producer that owns an industrial power generator and supplies surplus power to a transmission grid, an operator of a mega solar power system in which solar power generation panels are aggregated on a large scale, an operator of a wind farm power system in which many wind turbine generators are aggregated, or the like. In the present specification, the operators are hereinafter generically named electric power producers.

For stable operation of the electric power system that is constituted by the facilities of the plurality of operators, many parts are entrusted to the management operation of the electric power provider, but on the other hand, electric power producers are also required to cooperate in stable operation of the electric power system. In a case where the electric power producer takes part in planning of stable operation of the electric power system, it is necessary to sufficiently consider the manner of cooperation with the electric power producer or advantages and disadvantages of the electric power producer at that time.

For example, in a case where electric power demand is assumed and supply power is secured in an area of the electric power system that is operated by an existing electric power provider (power company or the electric power system operator), the electric power producer is expected to secure fixed reserve power for achieving a supply power securing obligation while preparing for dropout of power supply, upward swing of demand, and the like.

However, is it necessary to reduce the normal amount of power generation of the existing power source that is owned by the electric power producer by an amount to secure the reserve power in the electric power producer, this has the meaning of opportunity loss occurring in which a normal power generation opportunity is lost for the electric power producer. Here, conversion of the amount of power by the normal power generation opportunity loss of the electric power producer to an equivalent value is referred to as a power generation opportunity loss value.

Meanwhile, the electric power producer is able to obtain the equivalent value by offering a secured reserve power to a reserve power market (capacity market) and bidding to an electric power system operator organization (electric power provider) or another retailer. That is, the incentive works to secure the reserve power. The incentive that is converted to the equivalent value is referred to as a reserve power incentive value.

In the electric power producer, service that maintains power quality of the electric power system that secures the reserve power is referred to as an ancillary service, but in the electric power producer, standby reserve power that reduces normal power generation output is one ancillary service, and the electric power provider (power company or electric power system operator organization) markets the operation. In the ancillary service market, there is a problem of how the electric power producer operates an amount of the reserve power of the power generation facility.

PTL 1 discloses a method for securing the output reserve power by driving to intentionally reduce output of each windmill when an output increase request is notified from the electric power provider in a wind farm operated by the electric power producer, but does not indicate a method for determining how much of the reserve power is secured by reducing power generation in the power source from the viewpoint of the opportunity loss value described above occurring.

PTL 2 discloses a method in which an incentive that works in a wind farm with high output variation reduction capability is assumed in the wind farm operated by the electric power producer and increases or decreases the number of windmill groups for output variation adjustment, but does not indicate a direct relationship between the incentive and the amount of control of wind farm output. In addition, a method for determining the reserve power for adjusting supply and demand balance of the electric power system is not indicated.

From the above, in order to solve the problem described above, the present invention has an object of providing a power generation facility operation device and an operation method that are able to prepare a reserve power plan that maximizes a reserve power incentive value relative to a power generation opportunity loss value and appropriately control so as to output the prepared reserve power plan when securing reserve power to contribute to stable operation of an electric power system.

Solution to Problem

From the above, the present invention is a power generation facility operation device that is employed by an electric power producer for supplying power to a transmission grid, and is provided with a power generation opportunity loss value calculation means for calculating a power generation opportunity loss value, which is a loss value resulting from losing the power generation opportunity when output of the power generated from a power generation facility that is owned by the electric power producer is reduced according to a request for provision of reserve power desired by an electric power provider, a reserve power incentive value calculation means for calculating a reserve power incentive value, which is an equivalent value that is equivalent to an incentive obtained by the electric power producer from the electric power provider by output being reduced in the power generation facility that is owned by the electric power producer and the reserve power being supplied to the electric power provider, and a reserve power plan calculation means for calculating a power plan of the reserve power that the power generation facilities are to secure in order to keep the power generation opportunity loss value below the reserve power incentive value.

In addition, the present invention is a power generation facility operation method that is employed by an electric power producer for supplying power to a transmission grid, the method including calculating a power generation opportunity loss value, which is a loss value resulting from losing the power generation opportunity when output of the power generated from a power generation facility that is owned by the electric power producer is reduced according to a request for provision of reserve power desired by an electric power provider, calculating a reserve power incentive value, which is an equivalent value that is equivalent to an incentive obtained by the electric power producer from the electric power provider by output being reduced in the power generation facility that is owned by the electric power producer and the reserve power being supplied to the electric power provider, and calculating a power generation plan of the power generation facilities using a power generation opportunity loss value and the reserve power incentive value.

In addition, the present invention is a power generation facility operation method that is employed by an electric power producer for supplying power to a transmission grid, the method including determining whether or not to accept a request for provision of reserve power from an electric power provider by comparing a power generation value that is determined by an electric power purchase unit price and a reserve power value that is determined by a reserve power unit price when the reserve power is provided to the electric power provider.

Advantageous Effects of Invention

The present invention is able to maximize benefits for securing reserve power for electric power system adjustment by the power generation facility reducing output and contribute to stable operation of the electric power system even in a renewable energy power source facility.

BRIEF DESCRIPTION OF DRAWINGS

FIG. 1 is a diagram illustrating a configuration example of an entire power generation facility operation device according to an embodiment of the present invention.

FIG. 2 is a diagram illustrating an input and output relationship of data that is handled by the power generation facility operation device.

FIG. 3 is a diagram illustrating an example of electric power system reserve power plan data D1.

FIG. 4 is a diagram in which the electric power system reserve power plan data D1 in FIG. 3 is displayed in time series.

FIG. 5 is a diagram illustrating an example of power generation facility reserve power plan data D3.

FIG. 6 is a diagram in which the power generation facility reserve power plan data D3 in FIG. 5 is displayed in time series.

FIG. 7 is a diagram illustrating an example of incentive value unit price data D2.

FIG. 8 is a diagram in which the incentive value unit price data D2 in FIG. 7 is displayed in time series.

FIG. 9 is a diagram illustrating an example of input energy predicted data D4.

FIG. 10 is a diagram in which the input energy predicted data D4 in FIG. 9 is displayed in time series.

FIG. 11 is a diagram illustrating a process flow of power generation opportunity loss value calculation means 101.

FIG. 12 is a diagram illustrating a process flow of reserve power incentive value calculation means 102.

FIG. 13 is a diagram illustrating a process flow of reserve power plan output means 103.

FIG. 14 is a diagram in which process content in a power generation facility operation device 100 is displayed in time series.

FIG. 15 is a diagram illustrating a configuration example of an entire power generation facility operation device according to a second embodiment of the present invention.

FIG. 16 is a diagram illustrating an example of the power generation facility reserve power plan data D3 that is displayed by the reserve power plan output means.

DESCRIPTION OF EMBODIMENTS

A power generation facility operation device and a method according to embodiments of the present invention will be described below with reference to the drawings.

Embodiment 1

FIG. 1 is a diagram illustrating a configuration example of an entire power generation facility operation device according to an embodiment of the present invention. A power generation facility operation device 100 is provided as a facility of an electric power producer G that performs only power generation and utilizes a facility of an existing electric power provider P in power transmission. The power generation facility operation device 100 is constituted by a calculator and the like, and here main processing functions are power generation opportunity loss value calculation means 101, reserve power incentive value calculation means 102, and reserve power plan output means 103. In addition, an input device 104, an output device 105, a storage device 106, and the like are provided as ancillary equipment of the calculator. Note that, an electric power system operator organization 108 that is the existing electric power provider P may be connected to the electric power producer G via a communication network 107 in which it is possible to send and receive data in both directions.

The input device 104 is an interface for carrying out a predetermined instruction by the electric power producer that is a user in the power generation facility operation device 100. For example, the input device 104 is constituted by a keyboard, a mouse, a touch panel and/or a button, and the like.

The output device 105 is an interface for providing predetermined information to the electric power producer that is a user from the power generation facility operation device 100. For example, the output device 105 is constituted by a display and the like.

The storage device 106 is a storage device that is provided associated with the power generation facility operation device 100 that is a calculator main body. Various setting values or various process results that are necessary for calculation in the calculator, a computer program that stores process content in the calculator, and the like are held in the storage device 106. Note that, the storage device 100 may be configured within the calculator main body.

For example, the process functions (process means) 101, 102, and 103 according to the power generation facility operation device 100 is realized using a central processing unit (CPU) and a memory (neither shown in the drawings) that the power generation facility operation device 100 is provided with. For example, the CPU realizes functions according to each component described above 101, 102, and 103 by reading out the predetermined computer program from the storage device 106 in the memory.

FIG. 2 is a diagram illustrating an input and output relationship of data that is handled by the power generation facility operation device 100. The power generation facility operation device 100 captures and uses various data for executing the process functions from each place. A provider of the data is the existing electric power provider P (electric power system operator organization 108), an electric power trading market 203, a fuel procurement organization 207, a weather forecasting organization 208, and the like.

For example, electric power system reserve power plan data D1 that is a plan value of the reserve power that is necessary for the electric power system is acquired from the electric power system operator organization 108. Note that, the user may acquire from the storage device 106 the electric power system reserve power plan data D1 that is stored therein in advance using the input device 104.

In addition, the equivalent value that is obtained in a case where the reserve power is secured, that is, the incentive value unit price data D2 is acquired from the electric power trading market 203. Note that, the user may acquire from the storage device 106 the incentive value unit price data D2 that is stored therein in advance using the input device 104.

In addition, the power generation facility reserve power plan data D3 of the power generation facility that is a target is created and stored in the storage device 106. Note that, the power generation facility reserve power plan data D3 of the creation result may be transmitted to the electric power system operator organization 108. Furthermore, the power generation facility operation device 100 may transmit the created power generation facility reserve power plan data D3 to a power generation facility controller 205, which is equipment of the electric power producer, of the target power generation facility.

In addition, the power generation facility operation device 100 acquires input energy predicted data D4 that relates to prediction of the amount of input of the energy source that it input to the target power generation facility from an external organization such as the fuel procurement organization 207 or the weather forecasting organization 208 with respect to the power generation facility. Note that, in the acquisition, the user may acquire from the storage device 106 data that is stored therein in advance using the input device 104.

Note that, information which relates to prediction of the amount of input of the energy source that is input to the power generation facility is acquired from the fuel procurement organization 207 of heating fuel in a case where the target power generation facility is a heating power generation facility. In addition, in a case where the target power generation facility is a solar power generation facility or a wind power generation facility, the information is obtained from the weather forecasting organization 208 that handles the predicted data of an amount of solar radiation and wind conditions.

In the power generation facility operation device 100, power generation opportunity loss value data D6 and reserve power incentive value data D7 are created and stored in the storage device 106 as a result of the processes in each means 101, 102, and 103 in FIG. 1 using the input information D1, D2, D3, and D4.

FIG. 3 is a diagram illustrating an example of the electric power system reserve power plan data D1 that is obtained from the electric power system operator organization 108. The electric power system reserve power plan data D1 is constituted by time 301, period 302, necessary reserve power 303, and the like. For example, 30 minutes (1800 seconds) from 0 hours 30 minutes and 00 seconds of 1 Jan. 2015 is time series data such that a plan value of the necessary reserve power PSres (t) [kW] that is requested to the target power generation facility to 2000 kW. Note that, a length of the period 302 of the electric power system reserve power plan data D1 is arbitrary, and data may determine a reference value 304 (FIG. 4) of the necessary reserve power PSres (t) [kW] in each of year, month, week, and day or each season of spring, summer, autumn, and winter. In the example in the diagram, 1800 seconds and 30 minutes are used.

FIG. 4 is a diagram in which the electric power system reserve power plan data D1 in FIG. 3 is displayed in time series, and represents a state such that there is a request such that reserve power that is 1000 kW at a time t0, is 2000 kW at a time t1, is 3000 kW at a time t3, and is 1000 kW at a time t4 is secured by the existing electric power provider P (electric power system operator organization 108) in the electric power producer. Reserve power is examined to determine whether or not there is an amount such that the electric power producer is able to cooperate, and if possible, the reserve power is secured. Alternatively, presentation of a possible amount is requested in a case where security of the entire amount is difficult.

FIG. 5 is a diagram illustrating an example of the power generation facility reserve power plan data D3 that is created by the electric power producer. The power generation facility reserve power plan data D3 is constituted by time 401, period 402, power generation facility planned reserve power value 403, and the like. For example, 30 minutes (1800 seconds) from 0 hours 0 minutes and 0 seconds of 1 Jan. 2015 is time series of a planned reserve power value of the power generation facility so as to secure the reserve power PPres(t) [kW] to 800 kW.

FIG. 6 is a diagram in which the power generation facility reserve power plan data D3 in FIG. 5 is displayed in time series, and represents a state such that it is possible to provide the reserve power PPres(t) [kW] that is 800 kW at a time t0, is 1500 kW at a time t1, is 2000 kW at a time t3, and is 800 kW at a time t4 from the facility of the electric power producer.

FIGS. 3 to 6 indicate a relationship of a time series amount of the reserve power PPres(t) [kW] that it is possible for the electric power provider to provide with respect to reserve power PSres(t) [kW] that is necessary for the existing electric power provider P (electric power system operator organization 108).

The electric power producer calculates the advantages and disadvantages of the electric power producer when determining the power generation facility reserve power plan data D3. An advantage of the electric power producer according to reserve power security is calculated from the incentive value unit price data D2.

FIG. 7 is a diagram illustrating an example of incentive value unit price data D2. The incentive value unit price data D2 is constituted by time 501, period 502, incentive value unit price 503, and the like. For example, 30 minutes (1800 seconds) from 0 hours 30 minutes and 0 seconds of 1 Jan. 2015 is time series data in which the incentive is converted to a power amount unit price such that an incentive value unit price PRinc (t) [¥/kWh] is 20. Note that, a length of a period 502 of the incentive value unit price data D2 is arbitrary, and the incentive value unit price PRinc(t) [¥/kWh] may be determined to be fixed as a reference value 504 in each of year, month, week, and day or each season of spring, summer, autumn, and winter.

FIG. 8 is a diagram in which the incentive value unit price data D2 in FIG. 7 is displayed in time series, and indicates that the incentive value unit price is ¥20/kWh at a time t0, is ¥30/kWh at a time t1, is ¥40/kWh at a time t3, and is ¥20/kWh at a time t4.

FIGS. 7 and 8 introduce examples of the incentive value unit price data D2, but it is possible to similarly arrange the reserve power incentive value unit price data as a total value in which the incentive value unit price was multiplied by reserve power (generated power).

FIG. 9 is a diagram illustrating an example of input energy predicted data D4. The input energy predicted data D4 is constituted by time 701, period 702, input energy predicted value 703, and the like. An input energy predicted value Peng (t) [kW] is a power conversion value in which energy that corresponds to the target power source facility is converted according to energy-to-power conversion characteristics of the power generation facility. For example, in a case where the power generation facility is a wind power generation facility, the value is a power conversion value of the wind power energy from a wind speed value, in a case where the power generation facility is a solar power generation facility, the value is a power conversion value of the solar power energy from the amount of solar radiation, and in a case where the power generation facility is a heating power generation facility, the value is a power conversion value of the combustion heat energy from the amount of fuel.

According to the explanation in FIGS. 3 to 10, an example is described of the amount to be handled and elapsed time in the process in FIG. 2 in the present invention, therefore subsequently, description is made using process flows of FIGS. 11 to 13 as an example of process content that is used in the amount in the power generation device operation device 100. First, FIG. 11 illustrates a process flow of the power generation opportunity loss value calculation means 101 in the power generation device operation device 100 in FIG. 1.

In initial process step S101 of the power generation opportunity loss value calculation means 101, the electric power producer that is the user acquires from the storage device 106 the electric power system reserve power plan data D1 (refer to FIGS. 3 and 4) that is input and stored therein using the input device 104 in advance, or acquires the data from the electric power system operator organization 108 via the communication network 107.

In subsequent process step S102, the user acquires from the storage device 106 the time series input energy predicted data D4 of the power generation facility (refer to FIGS. 9 and 10) that is input and stored therein using the input device 104 in advance, or acquires the data from the fuel procurement organization 207 or a weather forecasting period 208 via the communication network 107.

Using the obtained data D1 and D4 described above, in the process flow of the power generation opportunity loss value calculation means 101, the process steps (S104 to S108) are executed in each process time within a plan creation target period within a range that is interposed by the process step S103 and the process step S109. In an example such as in FIG. 3, various amounts are input at an interval of 30 minutes, [00:00:00] to [02:30:00] of Jan. 1, 2015 is the plan creation target period, and for example, a process is executed in a one minute cycle as each process time.

First, in the process step S104, as a calculation method of a specific power generation opportunity loss value, a maximum output value Pmax(t) of the power generation facility is created as time series information from a power conversion value Peng(t) (603 in FIG. 9) of the input energy predicted value of the time t in a one minute cycle in the input energy predicted data D4. Here, for example, in a case where the input energy predicted value is obtained by the power generation facility at the amount of solar radiation in the solar power generation facility, a maximum output drive coefficient of the solar power generation facility is multiplied by the value and is calculated as the power conversion value. In addition, for example, in a case where the input energy predicted value is obtained by the power generation facility at the wind speed in the wind power generation facility, the maximum output drive coefficient of the wind power generation facility is multiplied by the value and is calculated as the power conversion value.

In subsequent process step S105, the sizes of the previously obtained maximum output value Pmax(t) at the time t and the necessary reserve power value PSres(t) (303 in FIG. 3) at the time t in the electric power system reserve power plan data D1 are compared.

In process step S106, in a case where the maximum output value Pmax (t) is large to be the necessary reserve power Pres (t) or more, the necessary reserve power PSres(t) is calculated as an assumed output reduction value Psus(t). Note that, in a case where the maximum output value Pmax (t) is the necessary reserve power Pres (t) or less, the process ends in the process time, and the process transitions to the process of the subsequent time.

Subsequently, in process step S107, a selling price POpri (t) per unit of power of the generated power of the time is acquired from the storage device 106 in which the price data is stored in advance, or for example, refers to the price data acquiring from an external organization such as the electric power trading market 203. Note that, the selling price POpri(t) per unit of power is a so-called power purchase price. The purchase price per unit power that is set in a case where power is sold by the electric power producer to the electric power provider.

In process step S108, a power conversion value VALopt (t) of a power generation opportunity loss value is calculated from the product of the selling price POpri per unit of power of the generated power and the assumed output reduction value Psus (t).

In process step S109, power generation opportunity loss value data D6 is created in time series by calculating the processes from process step S104 to process step S108 in each time within a plan creation target time.

In the final process step S110, the power generation opportunity loss value data in time series is stored in the storage device 106.

FIG. 12 is a diagram illustrating a process flow of the reserve power incentive value calculation means 102. The flow in FIG. 12 closely resembles the flow in FIG. 11, and the process step S107 in FIG. 11 and the process step S207 in FIG. 12 are essentially different.

In initial process step S201 of the reserve power incentive value calculation means 102, first, the electric power producer that is the user inputs and stores the electric power system reserve power plan data D1 (refer to FIGS. 3 and 4) using the input device 104 in advance and acquires the data from the storage device 106, or acquires the data from the electric power system operator organization 108 via the communication network 107.

In subsequent process step S202, the user acquires from the storage device 106 the time series input energy predicted data D4 of the power generation facility (refer to FIGS. 9 and 10) that is input and stored therein using the input device 104 in advance, or acquires the data from the fuel procurement organization 207 or the weather forecasting period 208 via the communication network 107.

Using the obtained data D1 and D4 described above, in the process flow of the power generation opportunity loss value calculation means 101, the process steps (S204 to S208) are executed in each process time within a plan creation target period within a range that is interposed by the process step S203 and the same process step S209. In an example such as FIG. 3, various amounts are input at an interval of 30 minutes, [00:00:00] to [02:30:00] of Jan. 1, 2015 is the plan creation target period, and for example, a process is executed in a one minute cycle as each process time.

First, in the process step S204, as a calculation method of a specific reserve power incentive value, a maximum output value Pmax (t) of the power generation facility is created as time series information from a power conversion value Peng (t) (603 in FIG. 9) of the input energy predicted value of the time t in a one minute cycle in the input energy predicted data D4. Here, for example, in a case where the input energy predicted value is obtained by the power generation facility at the amount of solar radiation in the solar power generation facility, a maximum output drive coefficient of the solar power generation facility is multiplied by the value and is calculated as the power conversion value. In addition, for example, in a case where the input energy predicted value is obtained by the power generation facility at the wind speed in the wind power generation facility, the maximum output drive coefficient of the wind power generation facility is multiplied by the value and is calculated as the power conversion value.

In subsequent process step S205, the sizes of the previously obtained maximum output value Pmax (t) at the time t and the necessary reserve power PSres (t) (303 in FIG. 3) at the time t in the electric power system reserve power plan data D1 are compared.

In process step S206, in a case where the maximum output value Pmax (t) is large to be the necessary reserve power Pres (t) or more, the necessary reserve power PSres (t) is calculated as an assumed output reduction value Psup (t). In addition, in a case where the maximum output value Pmax (t) is the necessary reserve power Pres (t) or less, the process ends in the process time, and the process transitions to the process of the subsequent time.

In process step S207, a selling price PRpri (t) per unit of reserve power of the time is stored in advance in the storage device 106 and the price data is acquired from the storage device 106, or for example, refers to the price data acquiring from an external organization such as the electric power trading market 203. In FIG. 2, in the power generation facility operation device 100, the incentive value unit price data D2 that is acquired from the electric power trading market 203 is the selling price PRpri (t) per unit of reserve power of the time. The selling price PRpri (t) has a meaning of a price of a power purchase in the electric power trading market 203 in a case where power is provided to the electric power trading market 203 if it is assumed that the electric power producer does not provide the reserve power to the electric power provider.

The electric power provider purchases power of the electric power producer according to the normal purchase price, but also there is an operator in configuring members of the electric power trading market 203 who considers to want to purchase power at a higher price at the same time, and here a value that is obtained when power is sold to the operator is considered.

In the subsequent process step S208, a reserve power incentive value VALinc (t) is calculated from the product of the selling price PRpri per unit of power of the reserve power and the assumed output reduction value Psup (t).

In the final process step S210, the reserve power incentive value data D7 in time series is stored in the storage device 106.

FIG. 13 is a diagram illustrating a process flow of the reserve power plan output means 103. In the initial process step S301 of the reserve power plan output means 103, the power generation opportunity loss data D6 is acquired from the storage device 106. In addition, in the process step S302, the reserve power incentive value data D7 is acquired from the storage device 106.

In the process step S304, in each time within the plan creation target time, the sizes of the power generation opportunity loss value VALopt (t) and the incentive value VALinc (t) at the time are compared.

In the process step S305, when the power generation opportunity loss value VALopt (t) is not more than the incentive value VALinc (t) , the maximum output value Pmax (t) is registered in a planned reserve power value PPres (t). Note that, when the power generation opportunity loss value VALopt (t) is not less than the incentive value VALinc (t), the value is held at the predicted maximum output value Pmax (t).

Power generation facility reserve power plan data is created in time series by calculating the process steps from process step S304 to process step S305 in each time within a plan creation target time.

In the final process step S307, the power generation facility reserve power plan data D3 is stored in time series in the storage device 106.

FIG. 14 is a diagram in which process content in the power generation facility operation device 100 is displayed in time series. In FIG. 14, a horizontal axis indicates a time axis t, a left vertical axis indicates an electric power generation facility output value PG, and a right horizontal axis indicates an electric power amount conversion value PW of the power generation opportunity loss value and the incentive value.

In FIG. 14, D1 that is indicated by a thin solid line is the electric power system reserve power plan data from the electric power system operator organization 108, and finally the power generation facility operation device 100 outputs the power generation facility reserve power plan data D3 that is indicated by a thick solid line to the electric power system operator organization 108. Here, the electric power system reserve power plan data D1 is equivalent to the necessary reserve power PSres (t) [kW] that indicates an increase and decrease in time series in the explanation in FIGS. 3 and 4. In addition, the power generation facility reserve power plan data D3 is equivalent to a power generation facility planned reserve power value PPres (t) [kW] that indicates an increase and decrease in time series in the explanation in FIGS. 5 and 6.

In addition, D2 that is indicated by a thin solid line is the incentive value unit price data, and is equivalent to the incentive value unit price PRinc(t) [¥/kWh] that indicates an increase and decrease in time series in the explanation in FIGS. 7 and 8. The size of the incentive value unit price data D2 is determined according to the size of necessary reserve power PSres(t) [kW] in each time (period) in the electric power system reserve power plan data D1. That is, the amount of demand of supplied power reflects the difference in the power price which becomes an incentive.

In addition, in FIG. 15, a maximum output Peng(t) [kW] is indicated by a thick dashed line based on the input energy predicted data D4 at each time (period). The maximum output Peng(t) [kW] is a maximum value that is determined using the size of wind speed, solar radiation, fuel, and the like according to the power generation facility. The power generation facility reserve power plan data D3 is obtained by reducing output from the maximum output Peng (t) [kW]. At this time, the amount of reduction of output (the assumed output reduction value Psus(t)) is converted to the power generation opportunity loss value data D6.

Meanwhile, the amount of reduction of output is converted to the reserve power incentive value data based on the incentive value unit price data D2 that is obtained from the electric power trading market 203.

According to the approach of the processes described above, finally the power generation opportunity loss value data that is obtained by the flow of FIG. 11 is VALop(t), and finally the reserve power incentive value data that is obtained by the flow of FIG. 12 is VALinc(t).

In the process in FIG. 13, in each time (period), the power generation facility reserve power plan data is determined such that [power generation opportunity loss value data]≤[reserve power incentive value data]. In comparison of size, when [power generation opportunity loss value data]>[reserve power incentive value data], the maximum output Peng is a plan value of the electric power generation facility output.

To be brief, the power generation facility reserve power plan data D3 is a plan value to adopt either a reduced output for securing the reserve power or a maximum output. Adopting either the reserve power or the maximum output that is set according to a time band in the power generation facility is determined based on whether [power generation opportunity loss value data]≤[reserve power incentive value data] holds true or does not hold true.

In a case of the example that is indicated in FIG. 14, in a period from time t1 to time t4, since an area of a down arrow is smaller than an area of an up arrow ([power generation opportunity loss value data]≤[reserve power incentive value data]), adoption of the reduced output as a plan value is indicated. In the same manner, in a period from time t0 to time t1 and a period from time t4 to time t5, since an area of a down arrow is larger than an area of an up arrow ([power generation opportunity loss value data]>[reserve power incentive value data]), adoption of the maximum output without securing the reserve power as a plan value is indicated.

Note that, when performing the determination described above, the size relationship of the facility output is a size relationship of rated output>maximum output (according to input energy of wind, solar radiation, fuel, and the like) >reduced output.

In addition, the process described above exemplifies application of wind power, solar light, and industrial thermal power, but needless to say, it is possible to apply to another facility if the facility belongs to the electric power producer, and is able to supply reserve power to the electric power provider. For example, application is possible even in nuclear power, discharge of a storage battery, or the like if there is mutual agreement.

Embodiment 2

FIG. 15 is a diagram illustrating a configuration example of an entire power generation facility operation device according to a second embodiment of the present invention. The present device is newly provided with power generation facility output control means 1D1 in addition to the power generation opportunity loss value calculation means 101, the reserve power value calculation means 102, and the reserve power plan output means 103 that function in the power generation facility operation device 100. In addition, the device is possible to obtain sensor information of the power generation facility by connecting to a power generation facility sensor 1202 via the communication network 107. Furthermore, the device is possible to transmit a control signal that controls an output operation of the power generation facility by connecting to a power generation facility controller 1203 via the communication network 107.

Since basic content in the present device is the same as indicated in embodiment 1, here, added function parts are described. First, the power generation facility output control means 1201 accumulates various sensor information from the power generation facility sensor 1002 based on an assumed power generation reserve power value of the time of the power generation facility reserve power plan data D3 that is output by the reserve power plan output means 103, and sends the control signal for electrically and/or mechanically controlling the output operation of the power generation facility with respect to the power generation facility controller 1203.

In a case where the target power generation facility is a wind farm that has a plurality of windmills, data which relates to function characteristics of each windmill is stored in the storage device 106, an output value, a rotor rotational speed, wind speed, and the like at the time is read out in real time from the sensor of the windmills along with data which relates to the function characteristics, and the control signal is transmitted such that an output value is issued that is equal to the planned reserve power value of the power generation facility reserve power plan data at the time with respect to a wind farm controller that performs distribution control in each windmill such that the entire output of the wind farm matches a target value.

FIG. 16 is a diagram illustrating a display example of the power generation facility reserve power plan data D3 that is created by the reserve power plan output means 103. The reserve power plan output means 103 may display the created power generation facility reserve power plan data D3 in the output device 104 in time series.

In addition, other than the power generation facility reserve power plan data D3, the electric power system reserve power plan data D1, the incentive value unit price data D2, the input energy predicted data D4, the power generation opportunity loss value data D6, and the reserve power incentive value data D7 may be displayed individually or in combination in the output device 104 in time series.

Note that, there is correspondence of a case in which No is determined in process step S105 in FIG. 11 and in process step S205 in FIG. 12 as further modification examples in the present invention described above. In this circumstance, reduction of the maximum output or more of the power generation facility is required, and the entire amount of reduction (stopping) is set for the power generation facility. In the embodiments described above, the value assessment is performed for the partial reduction, but it is also possible to perform value assessment that also targets the case of the entire amount of reduction (stopping).

REFERENCE SIGNS LIST

100 POWER GENERATION FACILITY OPERATION DEVICE

101 POWER GENERATION OPPORTUNITY LOSS CALCULATION MEANS

102 RESERVE POWER INCENTIVE VALUE CALCULATION MEANS

103 RESERVE POWER PLAN OUTPUT MEANS

104 INPUT DEVICE

105 OUTPUT DEVICE

106 STORAGE DEVICE

107 COMMUNICATION NETWORK

108 ELECTRIC POWER SYSTEM OPERATOR ORGANIZATION

203 ELECTRIC POWER TRADING MARKET

207 FUEL PROCUREMENT ORGANIZATION

208 WEATHER FORECASTING ORGANIZATION

205 POWER GENERATION FACILITY CONTROLLER

1101 POWER GENERATION FACILITY OUTPUT CONTROL MEANS

1102 POWER GENERATION FACILITY SENSOR

The invention claimed is:

1. A power generation facility system that controls production of power by a power generation facility in order to improve efficiency of a transmission grid, the system comprising:

a memory;

a communication interface that is communicatively coupled to the power generation facility, a fuel market and an energy market via a network; and a processor communicatively coupled to the memory and the communication interface, wherein the processor:

receives, using the communication interface, fuel pricing information from the fuel market, calculates a normal power generation cost for the power generation facility based on the fuel pricing information, calculates a power generation opportunity loss value based on the normal power generation cost, wherein the power generation opportunity loss is a loss value resulting from losing the power generation opportunity when output of the power generated from the power generation facility is reduced, receives, using the communication interface, energy pricing information from the energy market, calculates a reserve power incentive value based on the energy pricing information, wherein the reserve power incentive value is an incentive is an amount paid to external electric power producer to produce electricity, creates a power generation facility reserve power plan based on a comparison of the power generation opportunity loss value and the reserve power incentive value, and controls, using the communication interface, power production of the power generation facility according to the power generation facility reserve power plan.

2. The system according to claim 1, wherein the power generation opportunity loss value is calculated by multiplying a power unit price by a differential output of power generation output during maximum output driving according to a predicted amount of the time in an energy state that is input to the power generation facility and power generation output during predetermined output reduction driving by the power generation facility.

3. The system according to claim 2, wherein the reserve power incentive value is calculated by multiplying a power unit price of reserve power by a differential output of power generation output during maximum output driving according to a predicted amount of the time in an energy state that is input to the power generation facility and power generation output during predetermined output reduction driving by the power generation facility.

4. The according to claim 2, wherein the reserve power plan is created by performing size comparison of the power generation opportunity loss value and the reserve power incentive value at the time and calculates a reserve power plan amount with respect to the power generation facility in order to keep the power generation opportunity loss value below the reserve power incentive value.

5. The system according to claim 2, wherein the reserve power plan: reduces the power production of the power generation facility when the power generation opportunity loss value is below the reserve power incentive value, and increases the power production of the power generation facility when the power generation opportunity loss value is above the reserve power incentive value.

6. The system according to claim 1, wherein the reserve power incentive value is calculated by multiplying a power unit price of the reserve power by a differential output of power generation output during maximum output driving according to a predicted amount of the time in an energy state that is input to the power generation facility and power generation output during predetermined output reduction driving by the power generation facility.

7. The system according to claim 6, wherein the reserve power plan is created by performing size comparison of the power generation opportunity loss value and the reserve power incentive value at the time and calculates a reserve power plan amount with respect to the power generation facility in order to keep the power generation opportunity loss value below the reserve power incentive value.

8. The system according to claim 6, wherein the reserve power plan:

reduces the power production of the power generation facility when the power generation opportunity loss value is below the reserve power incentive value, and increases the power production of the power generation facility when the power generation opportunity loss value is above the reserve power incentive value.

9. The system according to claim 1, wherein the reserve power plan is created to keep the power generation opportunity loss value below the reserve power incentive value.

10. The system according to claim 9, wherein the reserve power plan:

reduces the power production of the power generation facility when the power generation opportunity loss value is below the reserve power incentive value, and increases the power production of the power generation facility when the power generation opportunity loss value is above the reserve power incentive value.

11. The system according to claim 1, wherein the reserve power plan:

reduces the power production of the power generation facility when the power generation opportunity loss value is below the reserve power incentive value, and increases the power production of the power generation facility when the power generation opportunity loss value is above the reserve power incentive value.

12. A power generation facility operation control method that control production of power by a power generation facility in order to improve efficiency of a transmission grid, the method comprising:

receiving, by a processor, fuel pricing information from a fuel market via communication interface;

calculating, by the processor a normal power generation cost for the power generation facility based on the fuel pricing information;

calculating, by the processor, a power generation opportunity loss value based on the normal power generation cost, wherein the power generation opportunity loss is a loss value resulting from losing the power generation opportunity when output of the power generated from the power generation facility is reduced;

receiving, by the processor, energy pricing information from an energy market via the communication interface;

calculating, by the processor, a reserve power incentive value based on the energy pricing information, wherein the reserve power incentive value is an incentive is an amount paid to external electric power producer to produce electricity, creating, by the processor, a power generation facility reserve power plan based on a comparison of the power generation opportunity loss value and the reserve power incentive value, and controlling, by the processor, power production of the power generation facility according to the power generation facility reserve power plan.

* * * * *